United States Patent [19]

Horling et al.

[11] 4,435,889

[45] Mar. 13, 1984

[54] METHOD AND APPARATUS FOR THE PRODUCTION OF A ROLLING BEARING CAGE

[75] Inventors: Peter Horling, Mainberg; Hermann Hetterich, Heidenfeld; Herbert Dobhan, Bergrheinfeld; Norbert Klupfel, Hambach, all of Fed. Rep. of Germany

[73] Assignee: SKF Kugellagerfabriken GmbH, Schweinfurt, Fed. Rep. of Germany

[21] Appl. No.: 287,898

[22] Filed: Jul. 29, 1981

[30] Foreign Application Priority Data

Aug. 9, 1980 [DE] Fed. Rep. of Germany ....... 3030247

[51] Int. Cl.$^3$ ............................................. B21D 53/12
[52] U.S. Cl. ........................... 29/148.4 C; 29/149.5 C
[58] Field of Search ...................... 72/352; 29/148.4 R, 29/148.4 A, 148.4 C, 149.5 R, 149.5 C, 149.5 DP, 149.5 S

[56] References Cited

U.S. PATENT DOCUMENTS

| 1,463,299 | 7/1923 | Staake | 29/148.4 C |
| 2,783,104 | 2/1957 | Anderson | 29/148.4 C |
| 3,228,227 | 1/1966 | Daniels | 72/352 X |
| 3,382,692 | 5/1968 | Bodine | 72/352 X |
| 3,644,971 | 2/1972 | Axbard | 29/148.4 C |
| 4,212,095 | 7/1980 | Warchol | 29/149.5 S |

FOREIGN PATENT DOCUMENTS

| 249210 | 6/1947 | France . | |
| 487972 | 4/1969 | Japan | 29/148.4 C |

Primary Examiner—Leon Gilden
Attorney, Agent, or Firm—Daniel M. Rosen

[57] ABSTRACT

A process and apparatus for forming a cage part, for a ball bearing, wherein the cage parts are annular with alternate flat portions and ball receiving recesses. The cage parts are formed by pressing the rings from cage material such as steel. The flat portions are formed with axially extending rivet pins or holes for receiving the rivet pins of another cage part, in order to enable fastening of the cage parts together. The rivet pins are formed by pressing operation at the time as forming the cage part, by the flowing of the material of the cage part into recesses in a die.

3 Claims, 5 Drawing Figures

METHOD AND APPARATUS FOR THE PRODUCTION OF A ROLLING BEARING CAGE

BACKGROUND OF THE INVENTION

This invention rates to a method and apparatus for the production of a rolling bearing cage of the type comprised of two cage parts. In this type of cage, the cage parts have alternate sections formed with recesses for the forming of pockets for rolling bodies, as well as flat attachment surfaces between the pockets, the flat surfaces of the two cage parts being directed toward one another. Rivet projections, or holes for receiving the projections of the other cage part, are provided in each of the flat surfaces or portions of the cage parts, in order to enable connection of the cage parts to one another.

Axbard, U.S. Pat. No. 3,664,971, corresponding to German reference number DE-OS 2,023,897 shows a method for production of two-part cages, in which the cage parts are prepared from a wire preferably having a round cross-section. The wire is formed into a ring with its ends welded to one another. After the forming of the ring from a flat piece, the cage halves are formed to their desired final shapes and are connected to one another by separately produced rivets. These rivets must be guided by a special apparatus into the rivet holes of the cage parts.

Swiss Patent No. 249,210 discloses a two-part ball bearing cage in which the rivet pins are pressed out of flat cage material, so that they are formed of the same element as the cage halves. This construction has the disadvantage that in order for the rivets to have adequate length the cross-section of the cage part must be so greatly reduced that it can easily be cracked at the junction between the rivet pin and the cage body.

The present invention is therefore directed to a method for the production of cages for rolling bearings, of the above type, in which the necessary length for the rivet pins for the forming of deformed heads, can be obtained without difficulty.

SUMMARY OF THE INVENTION

Briefly stated, in accordance with the invention, a ring with a preferably round or rectangular cross-section is formed in a hollow rectangular cross-section of a press to form the cage part. The floor of the hollow of the press has recesses distributed thereabout, so that during the pressing operation the material of the cage part is forced to flow into the recesses. The recesses are provided for the formation of rivet pins, whereby the rivet pins are fully formed at the end of the final formation of the cage part itself. As a result, the rivet pins formed in accordance with the invention have the necessary length without any danger of cracking at the projections between the rivets and the adjoining portion of the cage parts.

The ring, preferably of round or rectangular cross-section, can be formed of a section of a bar, the bar being bent to a circular form and the ends thereof joining by welding or the like. It will be apparent, of course, that the rings may be formed by other conventional techniques.

DESCRIPTION OF THE DRAWINGS

In order that the invention will be more clearly understood, it will now be disclosed in greater detail with reference to the accompanying drawings, wherein.

DETAILED DESCRIPTION OF THE PRESENT INVENTION

Figure 1:
FIG. 1 illustrates a cut-off round steel bar for the production a cage in accordance with the invention.
Figure 2:
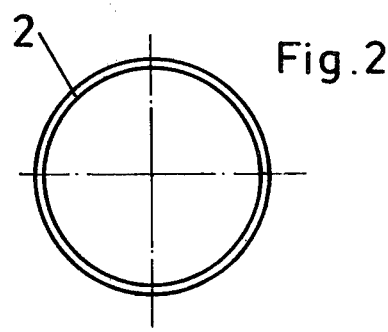
FIG. 2 illustrates a ring formed by bending of the round steel bar of FIG. 1 and welding its ends together.
Figure 3:
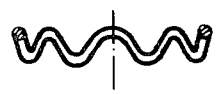
FIG. 3 illustrates the ring of FIG. 2, having a round cross-section, and preformed to have waves.
Figure 4:
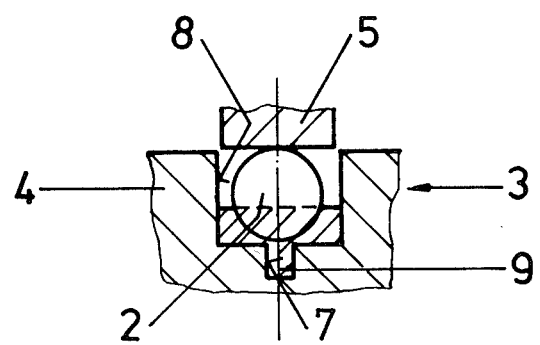
FIG. 4 illustrates, in a cross-sectional view, the preformed ring of FIG. 3 positioned in the lower die of a press.
Figure 5:
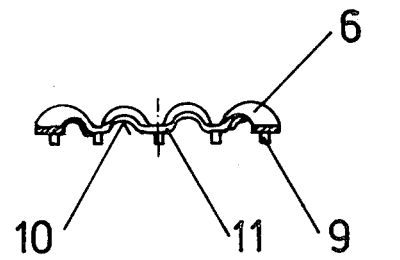
FIG. 5 illustrates, in cross-section, a cage part fabricated by pressing, in accordance with the invention, with rivets extending therefrom.

The round steel bar of FIG. 1 is cut off to the desired length, and then formed into the ring as illustrated in FIG. 2. The ends of the ring are joined together by a suitable welding process. Then the ring of FIG. 2 is shaped, for example by a conventional pressing technique, to have waves extending in the axial direction, as shown in FIG. 3. The ring of FIG. 3 is then laid in the lower die 4 of a press 3 as shown in FIG. 4, the press having a forming ram 5. In the press the ring 6 of FIG. 5 is formed by surface and pressure molding. In the pressure forming process, the material of the ring flows into the recesses on the bottom of the hollow cage of the lower die 4, so that rivet pins 9 will be formed by the axial working of the material of the ring into the die. Since the steel bar has a round cross-section, the cage part 6 produced in accordance with the invention will have rounded edges free of burrs. As a result, the necessary length for the rivet pins 9 for riveting the cage parts together can be obtained without difficulty. FIG. 5 illustrates a cage part in accordance with the invention, having sections with depressions 10 for receiving the balls (not shown) of a bearing and flat sections 11 interconnecting adjacent sections 10. The flat sections 11 are provided with the axially directed rivets 9. The rivet pins 9 are adapted to be inserted in holes in another cage part (not shown), with the parts being held together by deforming the heads of the rivets. The other cage part (not shown) may be formed and shaped in a manner of cage part 6, with the exception that the rivets are replaced by holes for receiving rivets.

The invention is not limited to the illustrated example thereof, and many changes may be made therein within the spirit of the invention. For example, the cage parts may be formed with a rivet pins formed on alternate flat portions 11, corresponding holes for receiving rivet pins of another cage thereto being formed in the intermediate flat portions 11. With this arrangement, the cage parts forming a complete cage may be identically formed and shaped. In addition, it is apparent that the shaping of the waves on the ring, as illustrated in FIG. 3, may be effected simultaneously with the forming of the cage parts by the pressing device as illustrated in FIG. 4.

What is claimed is:

1. A process for the production of a cage part for the cage of a rolling bearing, wherein the cage part is generally annular with alternate recesses for receiving rolling element and flat sections adapted to engage other cage parts, whereby the cage parts may be held together by riveting; and said method comprising forming a ring of a material of round or rectangular cross-section, and thereafter pressing said ring in a press having a hollow die with a rectangular cross-section and recesses distributed about the bottom of the hollow thereon, whereby the cage part is formed to its final shape and the material of the ring flows into said recess to form rivet pins simultaneously with the forming of the cage part, said pressing step forming the cage part with a substantially rectangular cross-section.

2. A method of claim 1 further comprising forming waves about the circumference of said ring before said step of pressing.

3. The method of claim 1 further comprising forming waves about the circumference of said ring during said step of pressing.

* * * * *